United States Patent [19]

Mizuta

[11] Patent Number: 5,012,569

[45] Date of Patent: May 7, 1991

[54] METHOD OF ASSEMBLING MAGNETIC DISK CARTRIDGE

[75] Inventor: Akira Mizuta, Kanagawa, Japan

[73] Assignee: Fuji Photo Film Co., Ltd., Kanagawa, Japan

[21] Appl. No.: 450,982

[22] Filed: Dec. 15, 1989

[30] Foreign Application Priority Data

Dec. 16, 1988 [JP] Japan .................. 63-317758

[51] Int. Cl.$^5$ ............................................. B23P 17/00
[52] U.S. Cl. .................................. 29/417; 29/418; 29/464; 83/14; 83/415
[58] Field of Search .................. 29/417, 418, 464; 83/14, 415, 278

[56] References Cited

U.S. PATENT DOCUMENTS 4,773,293 9/1988 Mizuta et al. .
4,814,927 3/1989 Iwamoto et al. .

FOREIGN PATENT DOCUMENTS 61-14895 1/1986 Japan .
61-162873 7/1986 Japan .

Primary Examiner—Mark Rosenbaum
Assistant Examiner—Frances Chin
Attorney, Agent, or Firm—Sughrue, Mion, Zinn, Macpeak & Seas

[57] ABSTRACT

When assembling a magnetic disk cartridge, a liner material strip having a plurality of circular openings arranged in a row at predetermined intervals is fed intermittently in the direction of the row of the openings and cut to predetermined lengths in synchronization with the intermittent feed to predetermined lengths, whereby liners each having a circular opening is formed. A locator pin which is smaller in diameter than the opening and has an arcuate locating side wall portion the radius of curvature of which is substantially equal to that of the opening is inserted into the frontmost one of the openings with the locating side wall portion opposed to the front edge of the frontmost one of the openings when the liner material strip is stopped. Then the liner material strip is pulled in the direction opposite to the direction of the intermittent feed of the liner material strip so that the front edge of the opening is brought into contact with the locating side wall portion of the locator pin, and the leading end portion of the liner material strip is cut to the predetermined length with the front edge of the opening kept in contact with the locating side wall portion of the locator pin, thereby forming each of the liners.

1 Claim, 4 Drawing Sheets

METHOD OF ASSEMBLING MAGNETIC DISK CARTRIDGE

BACKGROUND OF THE INVENTION

1. Field of the Invention

This invention relates to a method of assembling a magnetic disk cartridge, and more particularly to a method of assembling a magnetic disk cartridge in which a liner is cut from a liner material strip and mounted on a predetermined position in a shell of the cartridge.

2. Description of the Prior Art

In the magnetic disk cartridge, a liner for cleaning and protection of the magnetic recording medium is generally mounted on the inner surface of the shell. As disclosed in Japanese Unexamined Patent Publication No. 62(1987)-152696, each liner is cut from a liner material strip having a plurality of circular openings arranged in the longitudinal direction of the strip while the strip is intermittently fed in the longitudinal direction. The liner must be correctly mounted on the predetermined position in the shell in order to satisfactorily function. Therefore the liner is shaped to conform to the outline of the side wall of the shell or the outline of the rib of the shell so that the liner is correctly located relative to the shell.

However, in order to correctly locate the liner relative to the shell, the outline of the liner must be the same as the outline of the side wall of the shell or the outline of the rib of the shell at least at three portions though it need not be the same as the outline of the side wall of the shell or the outline of the rib of the shell in whole. When the liner is so shaped, it is apt to ride over the side wall or the rib when it is incorporated in the shell during assembly of the magnetic disk cartridge, which makes bad the workability in incorporation of the liner.

SUMMARY OF THE INVENTION

In view of the foregoing observations and description, the primary object of the present invention is to provide a method of assembling a magnetic disk cartridge in which the liner can be accurately and easily incorporated in the shell in a predetermined position.

In accordance with the present invention, when each liner is cut from a liner material strip having a plurality of circular openings, the leading edge of the liner is positioned by way of the circular opening which is nearest to the leading edge of the liner material strip so that the position of the liner can be known in the subsequent step and the liner can be correctly positioned relative to the shell without help of the side wall or the rib of the shell. That is, in accordance with the present invention, there is provided a method of assembling a magnetic disk cartridge in which a liner material strip having a plurality of circular openings arranged in a row at predetermined intervals is fed intermittently in the direction of the row of the openings and cut to predetermined lengths in synchronization with the intermittent feed, thereby forming liners each having a circular opening, and each of the liners is incorporated in a predetermined position in a shell, wherein the improvement comprises that a locator pin which is smaller in diameter than the opening and has an arcuate locating side wall portion the radius of curvature of which is substantially equal to that of the opening is inserted into the frontmost one of the openings with the locating side wall portion opposed to the front edge of the frontmost one of the openings when the liner material strip is stopped, the liner material strip is subsequently pulled in the direction opposite to the direction of the intermittent feed of the liner material strip so that the front edge of the opening is brought into contact with the locating side wall portion of the locator pin, and the leading end portion of the liner material strip is cut to the predetermined length with the front edge of the opening kept in contact with the locating side wall portion of the locator pin, thereby forming each of the liners.

The locator pin need not be circular in crosssection so long as it has a locating side wall portion having a radius of curvature substantially equal to that of the opening and it can be inserted into the opening. For example, the locator pin may be semi-circular or may be like a barrel-vault in cross-section.

Since the front edge of the opening and the locating side wall portion of the locator pin are curved, the liner material strip can be located with respect to the locator pin in both the longitudinal direction and the transverse direction when the front edge of the opening and the locating side wall portion of the locator pin are brought into contact with each other. When each of the liners is cut from the liner material strip in this state, the liner can be located with respect to the locator pin. Accordingly, the liner can be positioned in the shell with a satisfactory accuracy without help of the side wall or the rib of the shell. Accordingly, the liner may be sufficiently small in size irrespective of the side wall or the rib of the shell, and the liner can be accurately positioned in the shell with less possibility of its riding over the side wall or the rib.

DESCRIPTION OF THE PREFERRED EMBODIMENT

Figure 2:
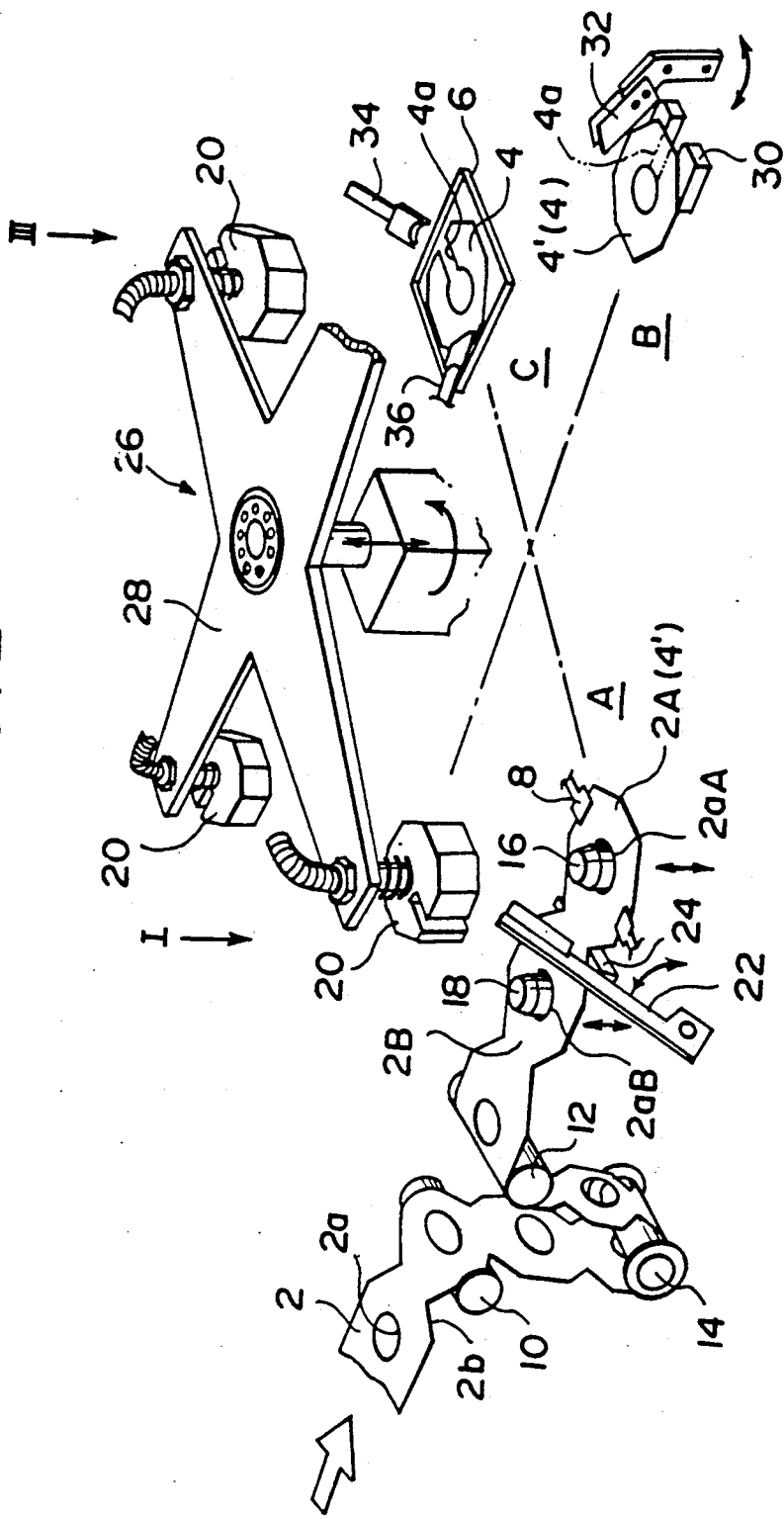
FIG. 2 is a schematic perspective view showing a system for carrying out the method.

In FIG. 2, liner blanks 4' are cut from a liner material strip 2 at a first station A and each liner blank is formed with an aperture 4a at a second station B, whereby liners 4 is formed. Then at a third station C, each liner 4 is set to a predetermined position in a shell 6 and is bonded to the inner surface of the shell 6 by tack welding.

The liner material strip 2 is formed of non-woven fabric and is intermittently fed to the first station A by a predetermined length at one time by a pair of grippers 8. The liner material strip 2 is provided, before it is fed to the first station A, with a plurality of circular openings 2a arranged in a row in the direction of feed of the liner material strip 2 and a plurality of pair of opposed cutaway portions 2b, each pair of opposed cutaway portions being formed between adjacent circular openings 2a. The liner material strip 2 is fed to the first station A by way of pass rollers 10 and 12 after it is provided with the circular openings 2a and the cutaway portions 2b. A counter roller 14 between the pass rollers 10 and 12 imparts tension to the leading end portion of the liner material strip 2 in the direction opposite to the direction of the intermittent feed of the liner material strip 2. When the liner material strip 2 is fed by the grippers 8 and the frontmost portion 2A is stopped at the first station A, a first locator pin 16 is moved upward and inserted into the circular opening 2aA in the frontmost portion 2A and at the same time a second locator pin 18 spaced from the first locator pin 16 by a predetermined distance is moved upward and inserted into the circular opening 2aB in the second frontmost portion 2B. Thereafter, the grippers 8 are caused to release the frontmost portion 2A, and a suction pad 20 is moved downward and pressed against the frontmost portion 2A, thereby fixing the position of the frontmost portion 2A. Thereafter, a cutter comprising upper and lower cutting edges 22 and 24 cuts the liner material strip 2 at a portion between the frontmost portion 2A and the second frontmost portion 2B. Thus the liner blank 4' is formed and is lifted held by the suction pad 20. The suction pad 20 is supported by a rotary incorporating system 26 and is rotated by the system 26 to bring the liner blank 4' to the next step. On the other hand, the next frontmost portion 2B is fed to the first station A by the grippers 8.

The rotary incorporating system 26 has a cross-shaped rotary arm 28 which is intermittently rotated in one direction 90° by 90°. Each of the four end portions of the cross-shaped rotary arm 28 is provided with a suction pad 20. When the rotary arm 28 is rotated by 90°, the liner blank 4' held by the suction pad 20 is brought to the second station B, and when the suction pad 20 is moved downward, the liner blank 4' is set to a pair of lower cutting edges 30 and a pair of upper cutting edges 32 are operated and cuts an aperture 4a with the liner blank 4' kept held by the suction pad 20. A liner 4 thus formed is lifted held by the suction pad 20 and is fed to the third station C by the rotation of the rotary arm 28. At the third station C, the suction pad 20 is moved downward and sets the liner 4 to the shell 6 which has been positioned in a predetermined position in the third station C. Thereafter, the liner 4 is welded to the inner surface of the shell 6 by a pair of welding heads 34 and 36. This welding is a tack welding and the liner 4 is welded to the shell 6 at three points, two points on opposite sides of the aperture 4a and a point diametrically opposed to the aperture 4a. By this tack welding the liner 4 is held in a predetermined position on the shell 6 prior to a final welding to be carried out later.

In order to correctly position the liner 4 relative to the shell 6, the position of the liner blank 4' (or the liner 4) relative to the suction pad 20 must be fixed. For this purpose, the frontmost portion 2A of the liner material strip 2 is positioned relative to the suction pad 20 in the manner shown in FIGS. 1A to 1D before the liner blank 4' is cut from the liner material strip 2.

Figure 1A:
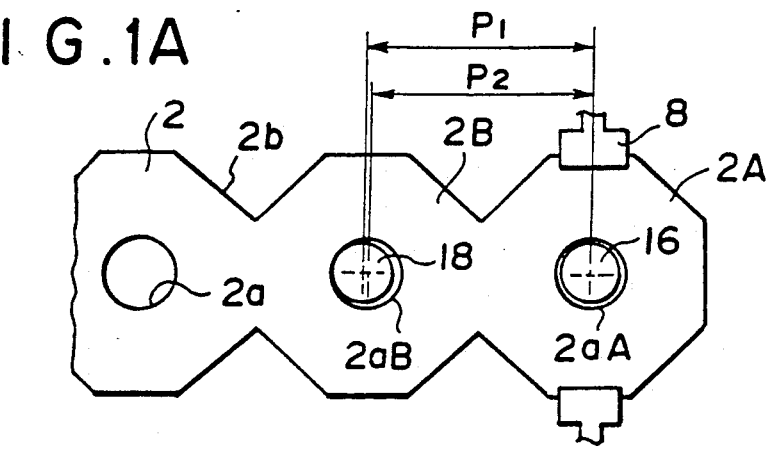
FIGS. 1A to 1D are views which as viewed in the direction arrow I in FIG. 2 and are for illustrating the steps of assembling a magnetic disk cartridge in accordance with an embodiment of the present invention.

As shown in FIG. 1A, the first and second locator pins 16 and 18 are circular in cross-section and slightly (by 2 to 4 mm) smaller in diameter than the circular opening 2a. The center-to-center distance P1 between the first and second locator pins 16 and 18 are slightly larger (by 1 to 2 mm) than the center-to-center distance P2 between the circular openings 2a. The first locator pin 16 is inserted into the opening 2aA in the frontmost portion 2A substantially coaxially with the opening 2aA while the second locator pin 18 is inserted into the opening 2aB in the second frontmost portion 2B with its axis deviated rearward from the center of the opening 2aB due to the difference between the center-to-center distances P1 and P2.

Figure 1B:
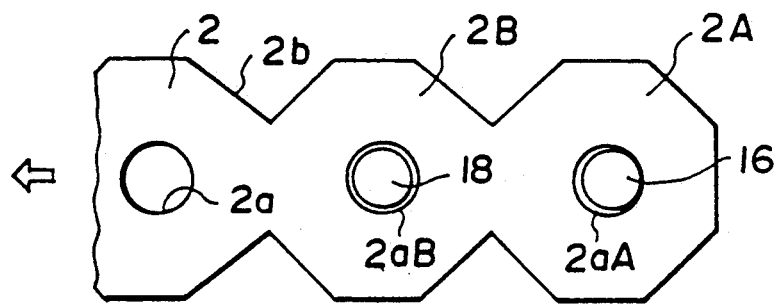

When the grippers 8 release the liner material strip 2 after the insertion of the locator pins 16 and 18, the liner material strip 2 pulled rearward under the tension imparted thereto by the counter roller 14 and the front edge of the opening 2aA in the frontmost portion 2A is brought into contact with the front face of the first locator pin 16 as shown in FIG. 1B. With this operation, the position of the frontmost portion 2A in the direction of feed is determined by abutment of the front edge of the opening 2aA and the front face of the first locator pin 16, and the position of the frontmost portion 2A in the transverse direction is determined by virtue of the fact that the front edge of the opening 2aA has a curvature which is substantially equal to that of the front face of the locator pin 16. That is, when the liner material strip 2 is pulled rearward, the frontmost portion 2A is brought to a position where the center of the opening 2aA is aligned with the axis of the locator pin 16 in the direction of feed of the liner material strip 2 by virtue of the curvatures of the front edge of the opening 2aA and the front face of the pin 16 which are brought into abutment with each other At this time, the second locator pin 18 is positioned substantially coaxially with the opening 2aB in the second frontmost portion 2B, and accordingly cannot adversely affect the positioning of the frontmost portion 2A.

Figure 1C:
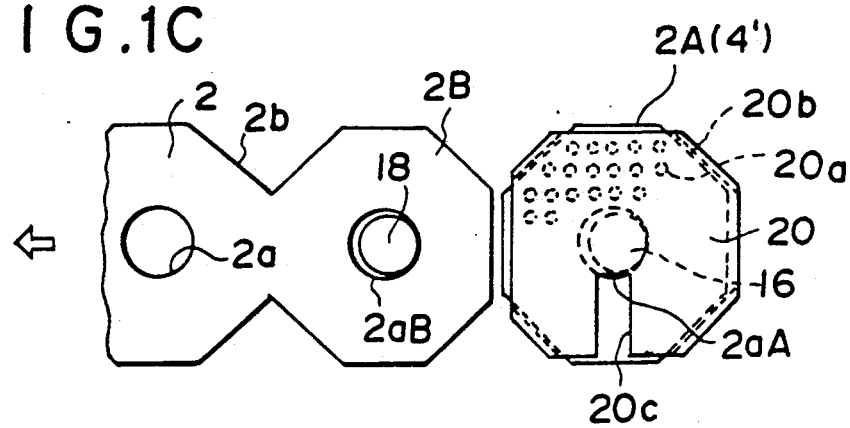

After thus positioned relative to the first locator pin 16, the frontmost portion 2A is fixedly held by the suction pad 20 as shown in FIG. 1C. Accordingly, when the position of the suction pad 20 relative to the locator pin 16 is fixed, the position of the frontmost portion 2A relative to the suction pad 20 is fixed. In order to fixedly hold the frontmost portion 2A, the suction pad 20 which is spring-urged is pressed against the frontmost portion 2A and then attracts the frontmost portion 2A under suction force. After the frontmost portion 2A is thus held by the suction pad 20, the frontmost portion 2A (the liner blank 4') is cut from the liner material strip 2. When the frontmost portion 2A is cut, the liner material strip 2 is pulled rearward under the tension imparted thereto by the counter roller 14 until the front edge of the opening 2aB in the second frontmost portion 2B is brought into abutment against the front face of the second locator pin 18. In order to certainly fix the liner blank 4' relative to the suction pad 20 while the liner blank 4' is transferred from station to station, a plurality of suction holes 20a (FIG. 4) are provided in the bottom face of the suction pad 20 over the entire area which is brought into contact with the liner blank 4'. Further, the bottom face of the suction pad 20 is provided with four flange-like protrusions (preferably 0.1 to 0.5 mm in height) 20b which extend along the four inclined sides of the liner blank 4' on the outside thereof close thereto. Further, the suction pad 20 is provided with a slit 20c through which the upper cutting edges 32 operates to cut the aperture 4a.

Figure 1D:
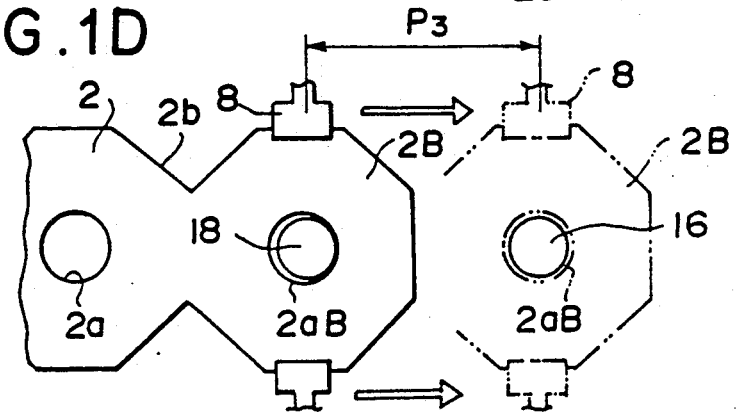

After the frontmost portion 2A is cut from the liner material strip 2 and is transferred to the second station B, the second frontmost portion 2B is gripped by the grippers 8 as shown in FIG. 1D, then the first and second locator pins 16 and 18 are moved downward, and then the grippers 8 move the liner material strip 2 to the position shown by the chained line in FIG. 1D where the first locator pin 16 is coaxial with the opening 2aB in the second frontmost portion 2B. At this time, the liner material strip 2 is fed by a distance which is larger than the distance P1 or P2 by a value which corresponds to the sum of the distances by which the liner material strip 2 is pulled rearward in FIGS. 1B and 1C (about 1 to 2 mm).

Figure 3:
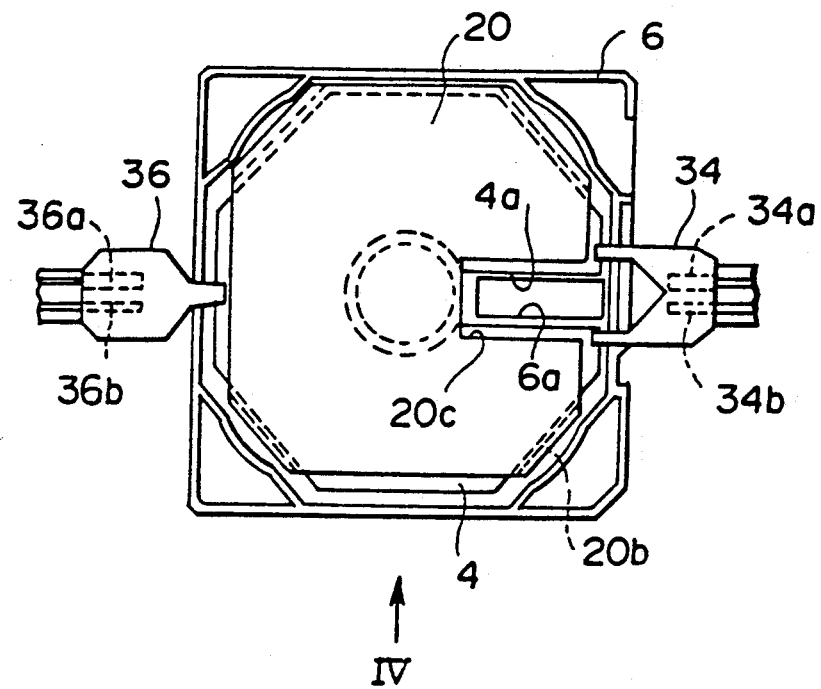
FIG. 3 is a view as viewed in the direction of III in FIG. 2.
Figure 4:
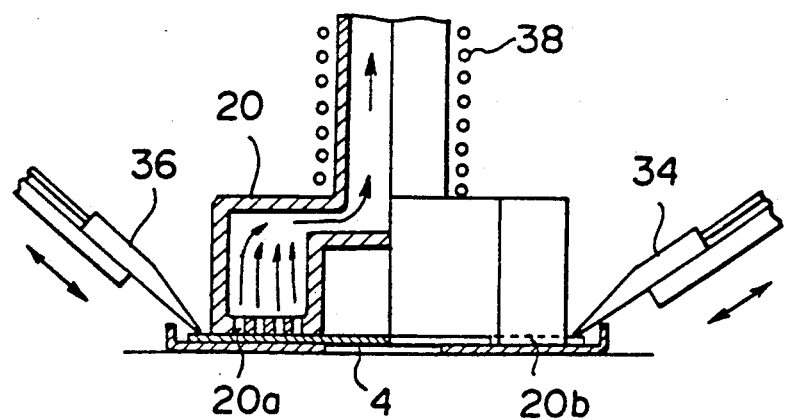
FIG. 4 is a view partly in cross-section as viewed in the direction of arrow IV in FIG. 2.

FIGS. 3 and 4 show the manner of tack welding at the third station C.

As can be seen from FIGS. 3 and 4, the liner 4 is set to the predetermined position in the shell 6 by the suction pad 20 and is pressed against the inner surface of the shell 6 under the force of a spring 38. Thereafter, the welding heads 34 and 36 are moved downward and bond the liner 4 to the shell 6 by hot welding. The welding head 34 has a bifurcated tip and welds the liner 4 to the shell 6 at two points on opposite sides of the aperture 4a. The other welding head welds the liner 4 to the shell 6 at a point diametrically opposed to the aperture 4s. The welding temperature of the welding heads 34 and 36 is kept constant (preferably about 200° C.) by built-in heaters 34a and 36a and heat sensors 34b and 36b. After the tack welding, the suction pad 20 releases the liner 4 and is moved upward with the liner 4 left there. The liner 4 mat be tacked to the shell 6 by a method other than hot welding, e.g., supersonic welding.

Figure 5:
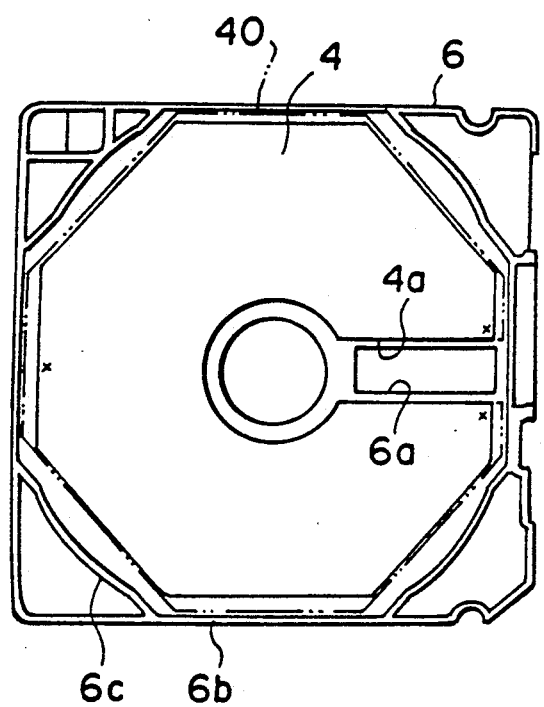
FIG. 5 is a plan view showing the liner incorporated in the shell.

FIG. 5 shows the liner 4 which has been welded to the shell 6.

Since the liner 4 is held by the suction pad 20 in the fixed position relative to the suction pad 20 and can be correctly positioned in the predetermined position or the rib 6c of the shell 6. Accordingly, unlike the conventional liner 40 shown by the chained line in FIG. 5, the outer shape of the liner 4 need not conform to the outline of the side wall 6b and the liner 4 can be set in the shell 6 with less possibility of its riding over the side wall 6b or the rib 6c. Further, since the liner 4 is tacked to the shell 6 as soon as it is set in the shell 6, the liner 4 is certainly kept in the predetermined position until it is finally welded to the shell 6. Further, since the liner 4 can be small in size, material consumption is saved. The liner 4 may be smaller so long as it can cover the recording track of the magnetic disk to be accommodated in the shell 6.

What is claimed is:

1. A method of assembling a magnetic disk cartridge in which a liner material strip having a plurality of circular openings arranged in a row at predetermined intervals is fed intermittently in the direction of the row of the openings and cut to predetermined lengths in synchronization with the intermittent feed, thereby forming liners each having one of said circular openings, and each of the liners is incorporated in a predetermined position in a shell, wherein the improvement comprises the steps of inserting a locator pin which is smaller in diameter than each of said circular openings and which has an arcuate locating side wall portion the radius of curvature of which is substantially equal to that of each of said openings into a frontmost one of said openings so that the locating side wall portion is opposed to a front edge of said frontmost one of said openings when the liner material strip is stopped; pulling the liner material strip in the direction opposite to the direction of the intermittent feed of the liner material strip so that the front edge of said frontmost one of said openings is brought into contact with the locating side wall portion of the locator pin; and cutting a leading end portion of the liner material strip to a predetermined length with the front edge of said frontmost one of said openings which is kept in contact with the locating side wall portion of the locator pin, thereby forming each of the liners.

* * * * *